(12) United States Patent
Kuroiwa et al.

(10) Patent No.: US 10,648,415 B2
(45) Date of Patent: May 12, 2020

(54) ENGINE-DRIVEN WORKING MACHINE

(71) Applicant: YAMABIKO CORPORATION, Ohme, Tokyo (JP)

(72) Inventors: Minoru Kuroiwa, Tokyo (JP); Akihiko Nohira, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 0 days.

(21) Appl. No.: 15/994,230

(22) Filed: May 31, 2018

(65) Prior Publication Data

US 2018/0347490 A1 Dec. 6, 2018

(30) Foreign Application Priority Data

Jun. 1, 2017 (JP) ................... 2017-109281

(51) Int. Cl.
*F02D 41/04* (2006.01)
*F02D 41/02* (2006.01)
(Continued)

(52) U.S. Cl.
CPC ............ *F02D 41/042* (2013.01); *F02B 63/02* (2013.01); *F02D 17/04* (2013.01); *F02D 31/002* (2013.01); *F02D 35/0053* (2013.01); *F02D 41/022* (2013.01); *F02D 41/064* (2013.01); *F02D 41/086* (2013.01); *F02M 1/00* (2013.01); *F02P 9/005* (2013.01); *B27B 17/10* (2013.01);
(Continued)

(58) Field of Classification Search
CPC .... F02D 41/042; F02D 17/04; F02D 35/0053; F02D 31/002; F02D 41/086; F02D 41/064; F02D 41/022; F02D 2200/101; F02D 2200/1015; F02D 2200/0802; F02D 2400/06; F02P 9/005; F02P 5/1508; F02B 63/02; F02M 1/00; F02M 37/007; F02M 3/07; F01N 2230/04; F01N 1/00; F01N 3/10; B27B 17/10; F16D 43/04
See application file for complete search history.

(56) References Cited

U.S. PATENT DOCUMENTS 6,218,804 B1 * 4/2001 Toriyama .............. F02N 15/006
123/198 R
6,651,608 B2 * 11/2003 Steffen .................... E01C 19/35
123/198 D
(Continued)

FOREIGN PATENT DOCUMENTS

| DE | 100 03 486 C1 | 7/2001 |
| JP | 2016-079843 A | 5/2016 |
| JP | 2016-148318 A | 8/2016 |

OTHER PUBLICATIONS

Extended Search Report issued in European Application No. 18175464.9, dated Oct. 30, 2018.

*Primary Examiner* — Hung Q Nguyen
*Assistant Examiner* — Brian P Monahon
(74) *Attorney, Agent, or Firm* — BakerHostetler

(57) ABSTRACT

An engine-driven working machine according to the present invention has a controller and a muffler. The controller is operated from starting of the engine in a rotational speed limitation mode in which the engine is prevented from rotating at a rotational speed that is higher than the predetermined limitation rotational speed. The controller forces to stop the engine, after a predetermined period has passed, during which the engine operates in the rotational speed limitation mode.

6 Claims, 4 Drawing Sheets

(51) Int. Cl.
 *F02D 41/06* (2006.01)
 *F02D 17/04* (2006.01)
 *F02D 41/08* (2006.01)
 *F02M 1/00* (2006.01)
 *F02D 31/00* (2006.01)
 *F02P 9/00* (2006.01)
 *F02D 35/00* (2006.01)
 *F02B 63/02* (2006.01)
 *F02M 37/00* (2006.01)
 *B27B 17/10* (2006.01)
 *F01N 1/00* (2006.01)
 *F02M 3/07* (2006.01)
 *F02P 5/15* (2006.01)
 *F16D 43/04* (2006.01)
 *F01N 3/10* (2006.01)

(52) U.S. Cl.
 CPC ............... *F01N 1/00* (2013.01); *F01N 3/10* (2013.01); *F01N 2230/04* (2013.01); *F02D 2200/0802* (2013.01); *F02D 2200/101* (2013.01); *F02D 2200/1015* (2013.01); *F02D 2400/06* (2013.01); *F02M 3/07* (2013.01); *F02M 37/007* (2013.01); *F02P 5/1508* (2013.01); *F16D 43/04* (2013.01)

(56) References Cited

U.S. PATENT DOCUMENTS

| | | | |
|---|---|---|---|
| 2002/0189219 A1 | 12/2002 | Steffen | |
| 2010/0147544 A1* | 6/2010 | Yoshizaki | F02D 11/04 173/176 |
| 2010/0229530 A1* | 9/2010 | Tanioka | B01D 53/9409 60/274 |
| 2011/0061370 A1* | 3/2011 | Aoyama | B01D 53/9431 60/285 |
| 2011/0320082 A1* | 12/2011 | Ishishita | B60K 6/445 701/22 |
| 2012/0193112 A1* | 8/2012 | Gwosdz | F02D 31/009 173/1 |
| 2012/0304966 A1* | 12/2012 | Fong | F02P 9/005 123/406.23 |
| 2013/0211692 A1* | 8/2013 | Asami | B60W 20/00 701/103 |
| 2014/0034011 A1* | 2/2014 | Gegg | F02D 31/009 123/406.11 |
| 2014/0165946 A1* | 6/2014 | Yanagihara | B25F 5/00 123/179.1 |
| 2014/0209078 A1* | 7/2014 | Bergman | F02B 63/02 123/65 R |
| 2014/0216370 A1* | 8/2014 | Ichihashi | F01N 3/046 123/41.65 |
| 2014/0230787 A1* | 8/2014 | Mezaki | B27B 17/083 123/406.52 |
| 2014/0299095 A1* | 10/2014 | Arai | F02N 3/02 123/343 |
| 2016/0123256 A1* | 5/2016 | Yoshizaki | F02B 63/02 477/175 |
| 2017/0101943 A1* | 4/2017 | Kuroiwa | B25F 5/001 |
| 2018/0347490 A1* | 12/2018 | Kuroiwa | F02B 63/02 |

* cited by examiner

ENGINE-DRIVEN WORKING MACHINE

FIELD OF THE INVENTION

The present invention relates to an engine-driven working machine, specifically, to an engine-driven working machine with a muffler.

BACKGROUND OF THE INVENTION

An engine-driven working machine with a muffler, such as a chain saw, a bush cutter, and a hedge trimmer, is known. A catalyst for purifying exhaust gas of an internal combustion engine is contained in the muffler (see, for example, Patent Publication 1).

A working machine has an engine, an actuating part (for example, a chain with cutting edges in a chain saw), and a centrifugal clutch disposed between the engine and the actuating part. The centrifugal clutch is configured to connect the engine with the actuating part when a rotational speed of the engine is higher than a predetermined clutch-in rotational speed so that rotations of the engine are transmitted to the actuating part.

The engine of the working machine is designed so that when a throttle valve of a carburetor provided in the engine is in a fully-closed position, the engine rotates stably at a rotational speed which is lower than the clutch-in rotational speed. This state is referred to as an idling state (normal idling state).

When the engine is started, especially in an insufficient warming-up state, in order to stabilize starting and running operations of the engine, the engine is generally started with the throttle valve of the carburetor in a half-opened position to increase an amount of air supplied to the engine and runs while the throttle valve is maintained in the half-opened position. This state is referred to as a fast idling state.

Generally when the engine is started, a brake for the actuating part is operated in order to prevent the actuating part from being actuated unintentionally. In the fast idling state, since the rotational speed of the engine may become higher than the clutch-in rotational speed due to the throttle valve in the half-opened state, the brake is preferably used for safety. However, if the engine is started in the fast idling state without using the brake, the actuating part could be actuated at the starting. In order to enable the starting operation to be in safe even in this situation, the engine is provided with a controller which can operate in a rotational speed limitation mode in which the rotational speed of the engine is prevented from becoming higher than a predetermined limitation rotational speed after the starting operation. When the limitation rotational speed is set to a rotational speed which is equal to or lower than the clutch-in rotational speed, the centrifugal clutch does not connect the engine with the actuating pat, so that, for example, the cutting edges of the chain saw are not rotated. When the limitation rotational speed is set to a rotational speed which is a little higher than the clutch-in rotational speed, for example, the cutting edges of the chain saw may be rotated at a very low rotational speed, but this rotation can be stopped by the brake.

The controller operates in the rotational speed limitation mode from the starting of the engine. Concretely, the controller detects the rotational speed of the engine, and when excess of the rotational speed of the engine over the limitation rotational speed is expected (when the rotational speed of the engine exceeds a predetermined rotational speed which is lower than the limitation rotational speed), the controller prevents the rotational speed of the engine from becoming higher than the limitation rotational speed by performing a misfiring cycle which makes an ignition device of the engine inoperative. Additionally by retarding an ignition timing of the ignition device, the controller may prevent the rotational speed of the engine from becoming higher than the limitation rotational speed.

On the other hand, when the operation of the controller is maintained in the rotational speed limitation mode, even if the throttle valve is moved to a fully-opened position, the rotational speed of the engine is prevented from becoming higher than the limitation rotational speed. As a result, the centrifugal clutch is not operated, and the rotations of the engine may not be transmitted to the actuating part or the cutting edges may be rotated only at a very low speed. Therefore, in order to operate the working machine, it is necessary to cancel the rotational speed limitation mode at an appropriate timing (see, for example, Japanese Patent Publication 2). For example, when the throttle lever of the engine is returned after the throttle lever is once moved to the fully-opened state, the rotational speed limitation mode is cancelled so that the working machine becomes in the idling state.

PRIOR ART PUBLICATION

Patent Publication 1: Japanese Patent Laid-open Publication No. 2016-148318
Patent Publication 2: Japanese Patent Laid-open Publication No. 2016-079843

SUMMARY OF THE INVENTION

An operation of the engine-driven working machine may not be started, namely, it is not used, soon after it is started. For example, after the working machine is started, it may be held for a while by a walking operator or it may be put down for a while for warming it. In these cases, the fast idling state and the rotational speed limitation mode are maintained for a while.

Further, it is difficult for an operator to distinguish from an appearance or sound of the working machine whether it is in such a not-in-use state, in which it is not used after it is started, or in the normal idling state. Concretely, when the limitation rotational speed in the rotational speed limitation mode is set to a rotational speed which is equal to or lower than the clutch-in rotational speed, for example, in the not-in-use state, the edges of the chain saw are stopped. Also in the normal idling state, the edges of the chain saw are stopped. Further, the sound of rotations of the engine in the not-in-use state is not much different from that in the normal idling state. Thus, it is difficult for the operator to distinguish from an appearance or sound of the chain saw whether it is in the not-in-use state or in the normal idling state. As a result, it is difficult for the operator to notice that the working machine is in the not-in-use state. Further, when the limitation rotational speed in the rotational speed limitation mode is set to a rotational speed which is a little higher than the clutch-in rotational speed and when the brake is activated in the not-in-use state so that, for example, the edges of the chain saw are stopped, the rotation sound of the engine is not much different from that in the normal idling state. Thus, it is difficult for the operator to distinguish whether it is in the not-in-use state or in the normal idling state. As a result, it is difficult for the operator to notice that the working machine is in the not-in-use state (or a state in which the rotational speed limitation mode is not cancelled).

As stated above, when the misfiring cycle is performed in the rotational speed limitation mode, since air-fuel mixture is not combusted, the exhaust gas of the engine includes uncombusted gas. Further, when the ignition timing is retarded in the rotational speed limitation mode, since an exhaust port is opened before the entire mixture is combusted, the exhaust gas of the engine includes uncombusted gas. The uncombusted gas generates heat when it is reacted with the catalyst in the muffler to be purified so that a temperature of the catalyst is increased. Thus, when the working machine is in the not-in-use state, the temperature of the muffler may be increased and the durability of the catalyst may be degraded.

Thus, it is an object of the present invention that a handheld engine-driven working machine is provided, in which even if an operator does not notice that the machine is not in use after it is started, it can be prevented from increasing a temperature of a muffler or degrading durability of a catalyst.

To achieve the above-stated object, an engine-driven working machine according to the present invention has an engine; an actuating part driven by the engine; a centrifugal clutch disposed between the engine and the actuating part; and a controller detecting a rotational speed of the engine to control the rotational speed; wherein the engine has a carburetor including a throttle valve, wherein when the rotational speed of the engine is higher than a predetermined clutch-in rotational speed, the centrifugal clutch connects the engine with the actuating part so as to transmit rotations of the engine to the actuating part, and wherein in a fast idling state in which the engine is operated while a throttle valve of a carburetor of the engine is maintained in a half-opened position, the controller is operated from starting of the engine in a rotational speed limitation mode in which the engine is prevented from rotating at a rotational speed that is higher than a limitation rotational speed by appropriately performing misfiring cycles, the working machine further having a muffler containing a catalyst for purifying exhaust gas of the engine, wherein the controller forces to stop the engine after a predetermined period has passed, during which the engine operates in the rotational speed limitation mode.

In this engine-driven working machine, the controller is operated from the starting of the engine in the rotational speed limitation mode in which the engine is prevented from rotating at a rotational speed that is higher than the predetermined limitation rotational speed by appropriately performing misfiring cycles. Then, the controller forces to stop the engine, after a predetermined period has passed, during which the engine operates in the rotational speed limitation mode. Thus, even if an operator does not notice that the working machine is not in use after it is started, it could be prevented from increasing a temperature of a muffler or degrading durability of a catalyst.

In an embodiment of the present invention, preferably, the predetermined limitation rotational speed is the clutch-in rotational speed.

In an embodiment of the present invention, the predetermined period may be a predetermined time period, a period until the number of the rotations of the engine reaches a predetermined accumulating number of times, a period until a temperature of the muffler reaches a predetermined temperature, or a period until a number of times of the misfiring of the engine reaches a predetermined number of times.

According to the engine-driven working machine according to the present invention, it can be prevented from increasing a temperature of a muffler or degrading durability of a catalyst due to continuation of the fast idling state and the rotational speed limitation mode for a relatively long period.

DETAILED DESCRIPTION OF EMBODIMENTS

Figure 1:
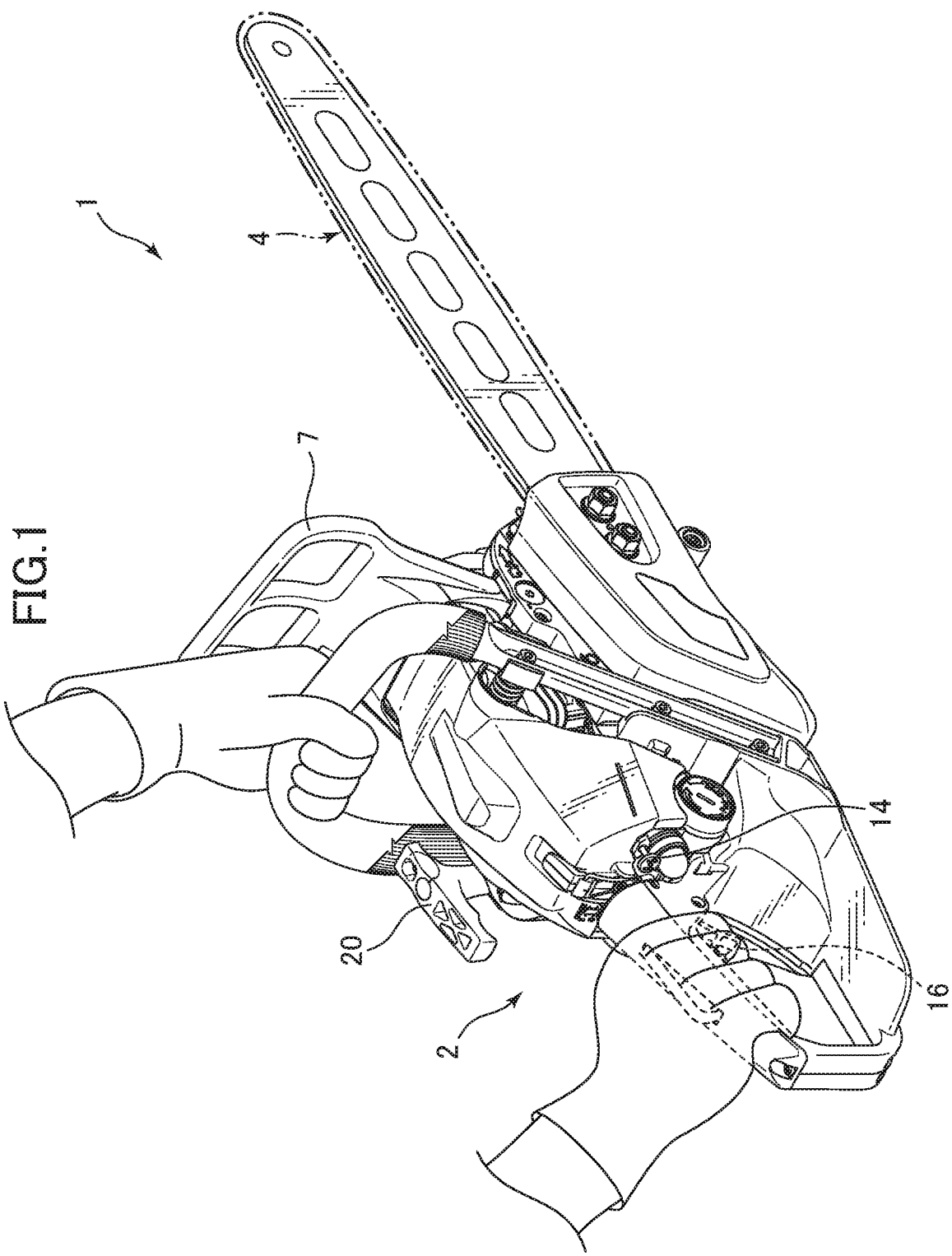
FIG. 1 is a perspective view of a chain saw.

Referring to the drawings, a chain saw which is an engine-driven working machine according to the present invention will be explained. As shown in FIG. 1, a chain saw 1 has an engine 2, a chain 4 with cutting edges which is an actuating part 4 driven by the engine 2, and a centrifugal clutch 6 (shown in FIG. 2) disposed between the engine 2 and the actuating part 4. The centrifugal clutch 6 connects the engine 2 with the chain 4 with cutting edges to transmit rotations of the engine 2 to the chain 4 with cutting edges when a rotational speed of the engine 2 is higher than a predetermined clutch-in rotational speed. The chain saw 1 also has a brake lever 7 which actuates a brake (not shown) to stop an output side of the centrifugal clutch 6. Since the engine 2, the chain 4 with cutting edges, the centrifugal clutch 6, and other structures in the chain saw 1 are those which are conventionally known, detail explanations thereof are omitted.

Figure 2:
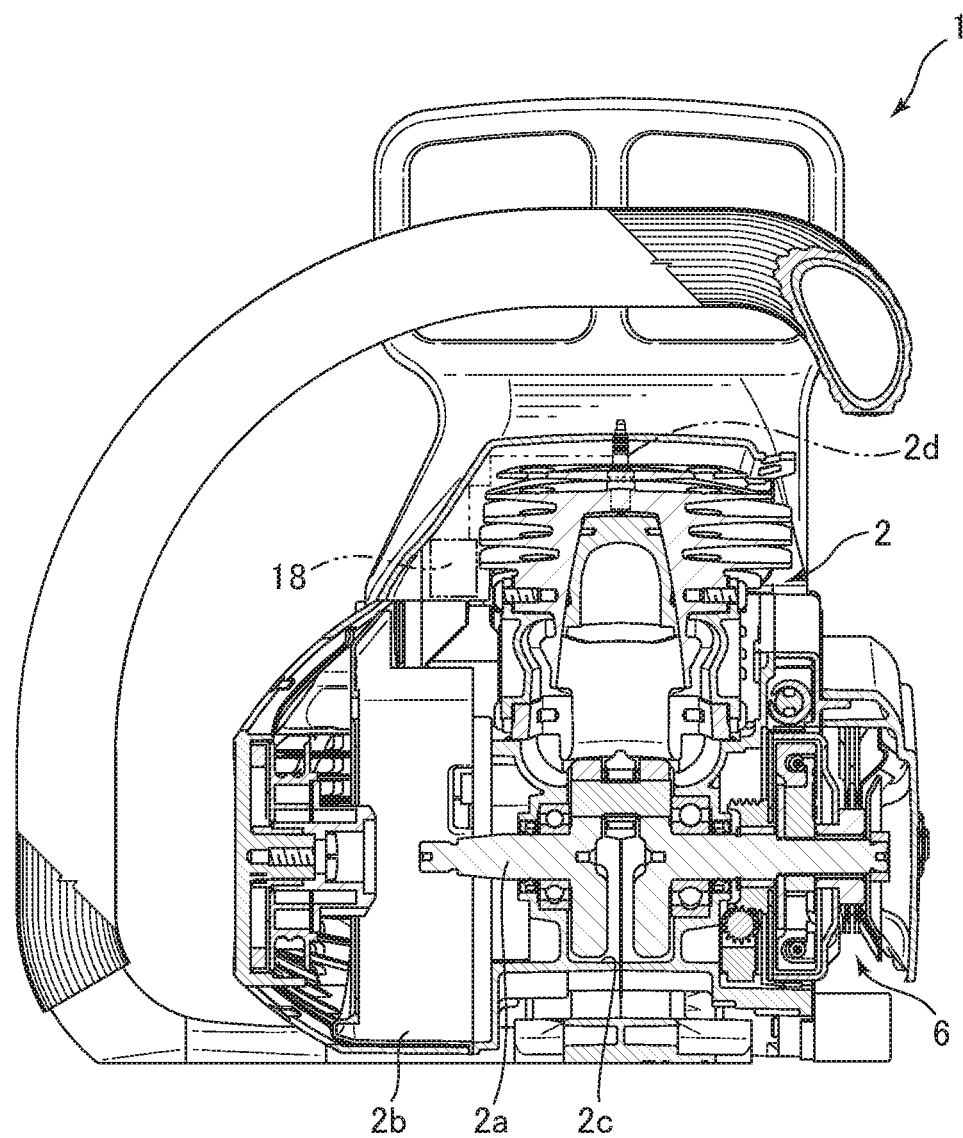
FIG. 2 is a cross-sectional view of a driving part of the chain saw.
Figure 3:
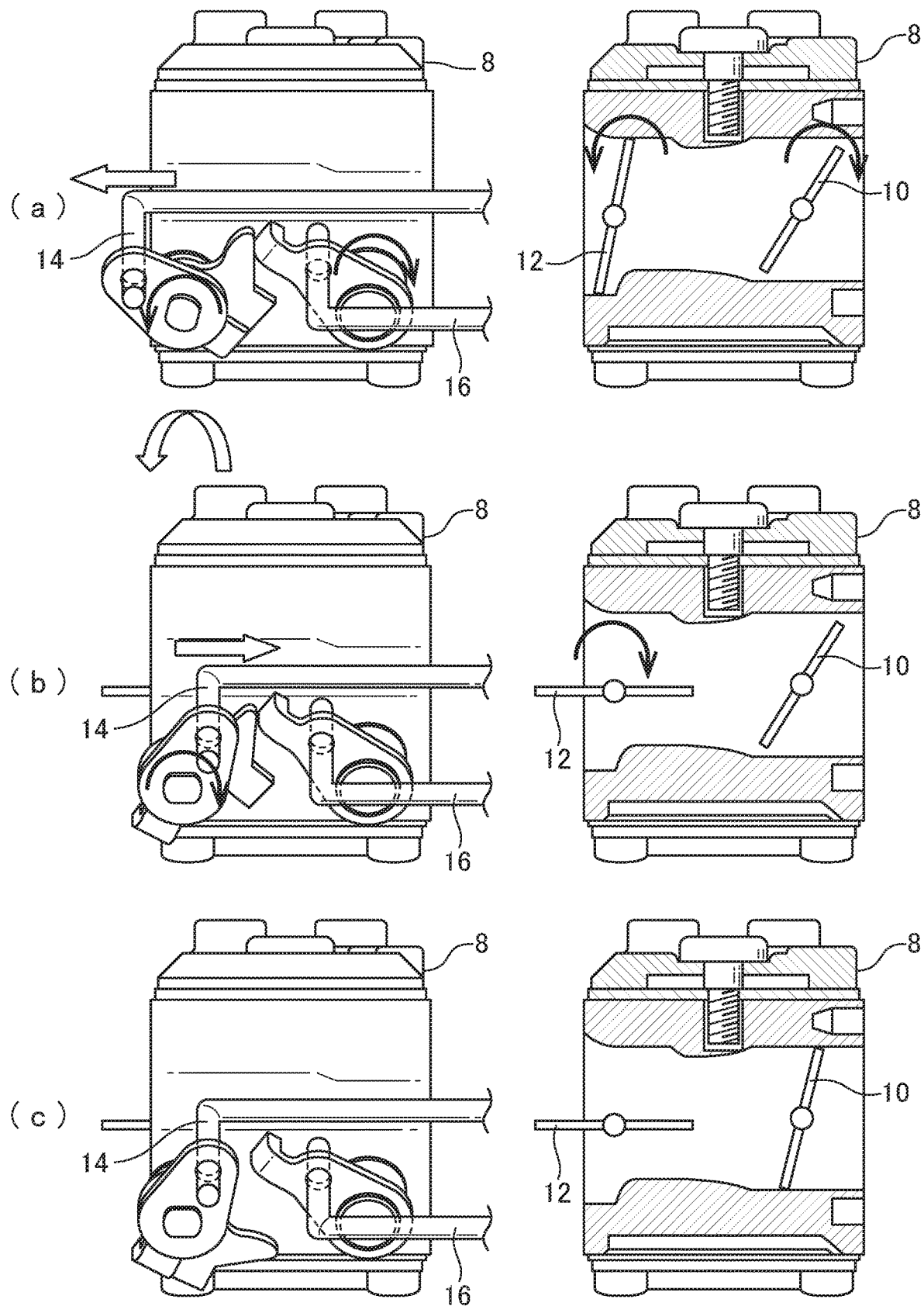
FIG. 3 is a schematic view of a throttle valve and a choke valve.
Figure 4:
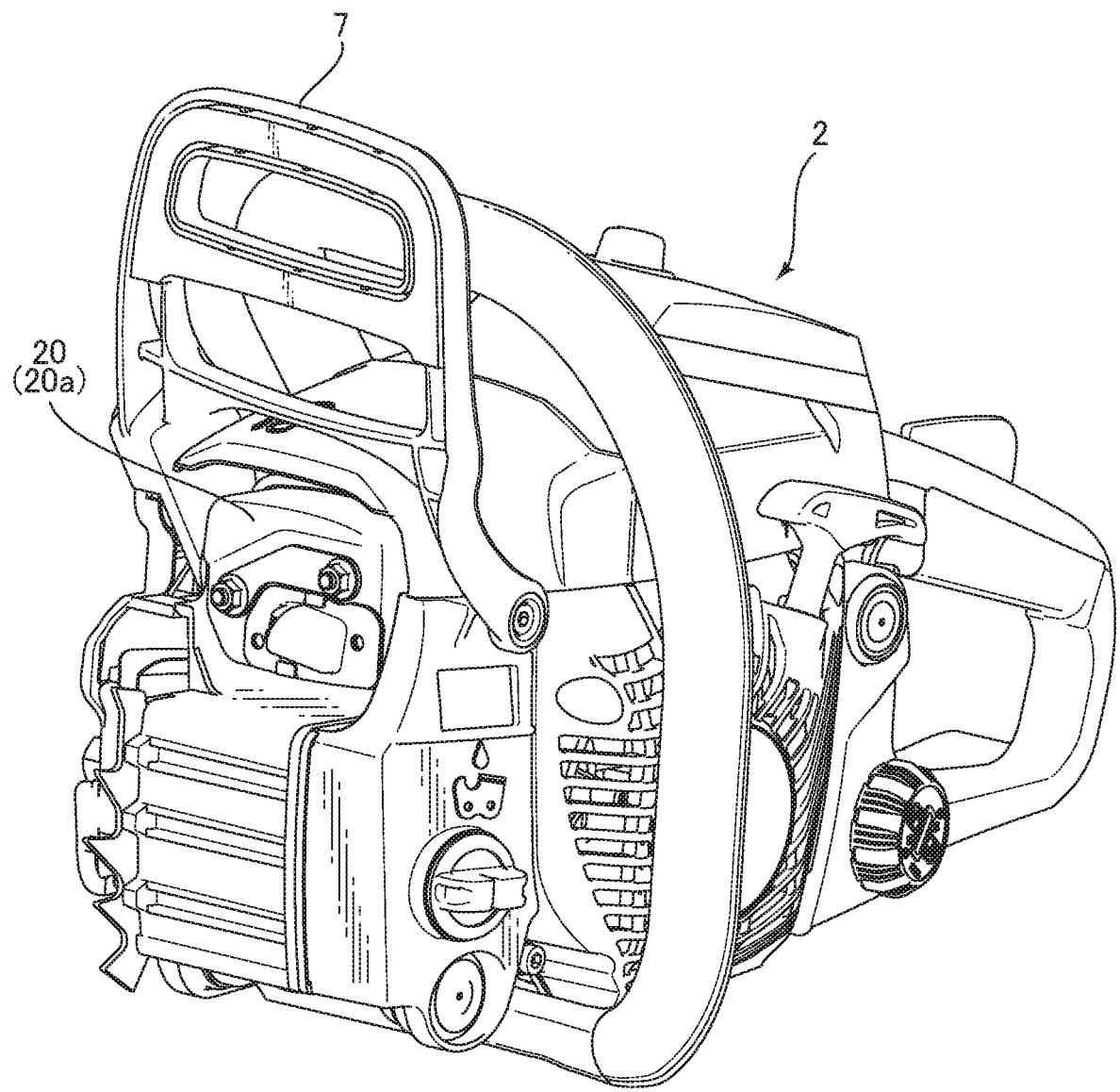
FIG. 4 is a perspective view of a chain saw.

As shown in FIG. 2, the engine 2 is preferably a two-stroke gasoline engine, and as shown in FIG. 3, a carburetor 8 provided in the engine 2 has a throttle valve 10 and a choke valve 12. The throttle valve 10 and the choke valve 12 are those which are conventionally known. The throttle valve 10 and the choke valve 12 may be configured to be moved independently or moved together so as to perform a specific operation. In the present embodiment, when a choke lever 14 (shown in FIG. 1) is actuated, the choke valve 12 is configured to be moved from a fully-opened position to a fully-closed position, while the throttle valve 10 is configured to be moved from a fully-closed position to a half-opened position, as shown in FIG. 3(*a*). Further, when the choke lever 14 is returned, the choke valve 12 is configured to be moved from the fully-closed position to the fully-opened position, while the throttle valve 10 is configured to be maintained in the half-opened position, as shown in FIG. 3(*b*). Further, the throttle valve 10 is configured to return from the half-opened position to the fully-closed position by actuating and then returning a throttle lever 16 (shown in FIG. 1), as shown in FIG. 3(*c*).

The engine 2 also has a controller 18 which detects a rotational speed of the engine 2 and controls the rotational speed. In the present embodiment, the rotational speed of the engine 2 is detected by detecting a magnet 2*b* attached to a crankshaft 2*a* of the engine 2 (or integrated with a flywheel), as shown in FIG. 2 and treating the detected magnet 2*b* with a program. For example, a time period required for one rotation of the crankshaft 2*a* of the engine 2 (or a crankshaft cycle period) is detected and the rotational speed is calculated based on the time period.

The working machine 1 has also a muffler 20. The muffler 20 has a shape of a housing and contains a catalyst 20*a* for purifying exhaust gas of the engine 2. Concretely, the muffler 20 has a partition (not shown) dividing an inside of the housing into two rooms (not shown), and the catalyst 20a is disposed at the partition. Thus, the muffler 20 is configured so that the exhaust gas is introduced into one of the rooms, passed through the catalyst 20a, and exhausted out of the other room.

Next, a method of starting the engine 2 will be explained.

By actuating the choke lever 14, the choke valve 12 is moved from the fully-opened position to the fully-closed position, while the throttle valve 10 is moved to the half-opened position, as shown in FIG. 3(a). This is called as a fast idling start and is especially effective to a cold-state start when the engine 2 is cold. Then, the engine 2 is started by pulling a recoil rope 20 (shown in FIG. 1). Since the choke valve 12 is in the fully-closed position, when a pressure inside of a crankcase 2c (shown in FIG. 2) becomes negative, a relatively large amount of fuel is supplied so that the engine 2 becomes in an easily-combusting state. A matter that the engine 2 becomes in a combustible state can be found when a first explosion is heard after the recoil rope 20 is pulled several times.

Then, the choke lever 14 is returned so that the choke valve 12 is moved to the fully-opened position, while the throttle valve 10 is maintained in the half-opened position, as shown in FIG. 3(b). Then, by pulling the recoil rope 20, the engine 20 is started. Since the throttle valve 10 is in the half-opened position, the engine 2 is operated in a fast idling state.

In the fast idling state in which the engine 2 is rotated while the throttle valve 10 of the engine 2 is maintained in the half-opened position, the controller 18 is operated from the starting of the engine 2 in a rotational speed limitation mode in which the engine 2 is prevented from rotating at a rotational speed which is higher than the clutch-in rotational speed. For example, in the rotational speed limitation mode, the controller 18 properly causes misfiring cycles in the engine 2 so as to prevent the engine 2 from rotating at a rotational speed which is higher than the clutch-in rotational speed. Concretely, when the rotational speed of the engine 2 exceeds a predetermined rotational speed (for example, 3200 rpm) which is lower than the clutch-in rotational speed, a misfiring cycle is caused to disable ignition plugs 2d (shown in FIG. 2) so that an increase of the rotational speed of the engine 2 is prevented. The rotational speed of the engine 2 in the fast-idling state is about 3000-4500 rpm.

When the misfiring cycle is performed in the rotational speed limitation mode, uncombusted gas is generated, and then exhausted and supplied into the muffler. Further, when the ignition timing is retarded, since the exhaust port is opened before the entire mixture is combusted, uncombusted gas is generated, and then exhausted and supplied into the muffler. When the uncombusted gas enters the muffler 20, the catalyst 20a in the muffler 20 reacts with the uncombusted gas to purify the exhaust gas. Further, due to heat caused by the reaction, the temperature of the catalyst 20a is increased. As a result, the temperature of the muffler 20 itself is increased and durability of the catalyst may be degraded.

In the present invention, the controller 18 forces to stop the engine 2 after a predetermined period has passed, during which the engine 2 operates in the rotational speed limitation mode. Thus, even if the operator does not notice that the working machine is not in use after it is started, it can be prevented from increasing the temperature of the muffler or degrading durability of the catalyst.

In order to force to stop the engine 2, the controller 18 may stop supplying fuel or stop ignitions.

The predetermined period is a predetermined time period, for example, 10-30 seconds. Alternatively, the predetermined period may be a period until the number of the rotations of the engine reaches a predetermined accumulating number of times, for example, 500-1500 rotations. Further, the predetermined period may be a period until a temperature of the muffler reaches a predetermined temperature, for example, 150-400° C. In this case, a temperature sensor may be provided at an inlet or outlet of the muffler 20. Further, the predetermined period may be a period until a number of times of the misfiring of the engine reaches a predetermined number of times, for example, 400-1200 times.

Although the above-stated embodiments of the present invention have been explained, the present invention is not limited to the above-stated embodiments, namely, a various modifications are possible within the scope of the present invention recited in the claims. It goes without saying that such modifications are also within the scope of the present invention.

What is claimed:

1. An engine-driven working machine comprising:
an engine;
an actuating part driven by the engine;
a centrifugal clutch disposed between the engine and the actuating part; and
a controller detecting a rotational speed of the engine to control the rotational speed,
wherein the engine has a carburetor including a throttle valve,
wherein when the rotational speed of the engine is higher than a predetermined clutch-in rotational speed, the centrifugal clutch connects the engine with the actuating part so as to transmit rotations of the engine to the actuating part, and
wherein in a fast idling state in which the engine is operated while a throttle valve of a carburetor of the engine is maintained in a half-opened position, the controller is operated from starting of the engine in a rotational speed limitation mode in which the engine is prevented from rotating at a rotational speed that is higher than a predetermined limitation rotational speed by appropriately performing misfiring cycles,
further comprising a muffler containing a catalyst for purifying exhaust gas of the engine,
wherein the controller is configured to completely stop the engine to prevent a temperature of the catalyst from increasing after a predetermined period has passed, during which the engine operates in the rotational speed limitation mode.

2. The engine-driven working machine according to claim 1, wherein the predetermined limitation rotational speed is the clutch-in rotational speed.

3. The engine-driven working machine according to claim 1, wherein the predetermined period is a predetermined time period.

4. The engine-driven working machine according to claim 1, wherein the predetermined period is a period until the number of the rotations of the engine reaches a predetermined accumulating number of times.

5. The engine-driven working machine according to claim 1, wherein the predetermined period is a period until a temperature of the muffler reaches a predetermined temperature.

6. The engine-driven working machine according to claim 1, wherein the predetermined period is a period until a number of times of the misfiring of the engine reaches a predetermined number of times.

* * * * *